United States Patent
Forero Rueda

(10) Patent No.: US 12,172,553 B1
(45) Date of Patent: Dec. 24, 2024

(54) CHILD SEAT INSTALLATION CHECKING DEVICE

(71) Applicant: GM Global Technology Operations LLC, Detroit, MI (US)

(72) Inventor: Manuel Forero Rueda, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

(21) Appl. No.: 18/359,545

(22) Filed: Jul. 26, 2023

(51) Int. Cl.
  *G08B 21/00* (2006.01)
  *B60N 2/26* (2006.01)

(52) U.S. Cl.
  CPC .................. *B60N 2/268* (2023.08)

(58) Field of Classification Search
  CPC ........ B60N 2/90; B60N 2/002; B60N 2/2821; B60N 2/2869; B60N 2/2875; B60N 2002/981; B60N 2210/18; B60N 2210/22; B60N 2230/10; B60N 2230/20; B60N 2/268; B60N 2/2857; B60R 21/01554; B60R 21/01556; G08B 21/22
  USPC ............ 340/686.1, 686.2, 457, 457.1, 573.1, 340/573.4, 687; 297/250.1, 256.16, 217.3
  See application file for complete search history.

(56) References Cited

U.S. PATENT DOCUMENTS

| | | | |
|---|---|---|---|
| 6,749,260 B2 * | 6/2004 | Abel | B60N 2/2839 242/388.3 |
| 7,735,920 B2 * | 6/2010 | Hinze | B60N 2/2812 297/216.12 |
| 8,089,369 B2 * | 1/2012 | Stojanovic | B60N 2/2887 73/862.51 |
| 11,396,248 B2 * | 7/2022 | Lau | B60N 2/268 |
| 11,485,263 B2 * | 11/2022 | Zhang | B60N 2/90 |
| 2005/0280297 A1 | 12/2005 | Patterson et al. | |

FOREIGN PATENT DOCUMENTS

| | | |
|---|---|---|
| DE | 202012007313 U1 | 11/2012 |
| DE | 102020124767 A1 | 4/2021 |
| DE | 102021111524 A1 | 5/2022 |
| DE | 112021004410 T2 | 7/2023 |

OTHER PUBLICATIONS

United States Patent and Trademark Office. U.S. Appl. No. 18/347,070, filed Jul. 5, 2023.
United States Patent and Trademark Office. U.S. Appl. No. 18/347,094, filed Jul. 5, 2023.

* cited by examiner

*Primary Examiner* — Anh V La
(74) *Attorney, Agent, or Firm* — Vivacqua Crane, PLLC

(57) ABSTRACT

A child seat installation checking device includes an attachment portion and an anchor portion. The attachment portion engages with a portion of a child seat. The anchor portion is movable relative to and separate from the attachment portion. The anchor portion engages with a portion of a vehicle seat. A shaft extends from the attachment portion to and through a portion of the anchor portion. A tension applicator mechanism is formed in the anchor portion. The shaft extends through and is movably retained within the tension applicator mechanism. A handle is disposed on an end of the shaft opposite the attachment portion. A displacement indicator displays a quantity of movement of the shaft relative to the anchor portion. Axial tension applied to the shaft as the handle is pulled away from the anchor portion causes the displacement indicator to display a displacement of the shaft.

20 Claims, 2 Drawing Sheets

CHILD SEAT INSTALLATION CHECKING DEVICE

INTRODUCTION

The present disclosure relates to children's car seats and how such car seats are secured within a vehicle. More specifically, this disclosure provides a device for measuring child seat installation tightness holding a child's car seat onto a vehicle seat, thereby assuring that the child seat is securely fastened into the vehicle.

Child car seats are required by law in many jurisdictions, as they have been empirically shown to significantly increase the safety of children being transported in vehicles. A child's car seat is generally fabricated to incorporate belt receiver slots or other similar members for receiving a standard vehicle seatbelt therein, and thereby providing for the seatbelt to be used in securing the child's car seat in place on a vehicle seat. Nevertheless, many children are still injured when the seatbelt holding the child's car seat in place has not been properly secured around the child's car seat or when the seatbelt is unintentionally loosened or left unfastened.

Accordingly, while current child's car seats and their securing mechanisms operate for their intended purpose when properly secured, there is a need for a new and improved system and method for checking the installation of children's car seats that ensures that the child's car seat is properly and securely attached to the vehicle seat by the seatbelt, without hindering the child car seat installation mechanism and procedure, while reducing child car seat installation complexity and confusion, and reducing the potential for unintentionally leaving the child's car seat unsecured or improperly secured within the vehicle.

SUMMARY

According to several aspects, a child seat installation checking device includes an attachment portion and an anchor portion. The attachment portion engages with and is in contact with a portion of a child seat. The anchor portion is movable relative to and separate from the attachment portion. The anchor portion engages with and is in contact with a portion of a vehicle seat. A shaft extends from the attachment portion to and through a portion of the anchor portion. A tension applicator mechanism is formed in the anchor portion. The shaft extends through and is movably retained within the tension applicator mechanism. A handle is disposed on an end of the shaft opposite the attachment portion. A displacement indicator displays a quantity of movement of the shaft relative to the anchor portion. The handle is adapted to be grasped by human hands or by a machine, and axial tension applied to the shaft as the handle is pulled away from the anchor portion so that the attachment portion is drawn towards the anchor portion causes the displacement indicator to display a displacement of the shaft.

In another aspect of the present disclosure the attachment portion is formed as a child seat attachment that engages with and rigidly braces against a structural component of the child seat.

In a yet another aspect of the present disclosure the attachment portion is shaped as one or more of an L-shaped bracket, a hook, a T-bar, a latch, or a threaded fitting.

In a yet another aspect of the present disclosure the anchor portion extends from a vehicle contact portion to the tension applicator mechanism. The vehicle contact portion rigidly braces against a structural portion of the vehicle seat or against a structural component of a vehicle in which the vehicle seat is disposed.

In a yet another aspect of the present disclosure each of the anchor portion, the shaft, and the attachment portion are formed of substantially rigid materials.

In a yet another aspect of the present disclosure the tension applicator mechanism further includes one or more of a ratchet, a latch, a spring, a plurality of detents and a pawl, or a threaded receiver for the shaft; and the tension applicator is capable of applying or maintaining an axial tension along the shaft.

In a yet another aspect of the present disclosure the handle further includes one or more of a knob, a t-handle, or a rotatable wheel affixed to the shaft, and the handle is graspable by human hands or by a machine. The knob is manipulated by one or more of pulling, pushing, or twisting to apply axial tension to the shaft by drawing the shaft towards and through the tension applicator mechanism.

In a yet another aspect of the present disclosure the displacement indicator further includes one or more of a visual indicator and an audio indicator. The visual indicator includes at least one of: a gauge, a ruler, a light source, and a color gradient, and the audio indicator includes at least one of: a click and a chime. The displacement indicator depicts an axial displacement of the shaft relative to the tension applicator mechanism.

In a yet another aspect of the present disclosure the tension applicator mechanism further includes a tension yield point. The tension yield point is a predetermined amount of tension appliable to the shaft, and to the child seat before the device measures displacement of the child seat via the displacement indicator. The tension applicator mechanism further includes a final tension yield point. The final tension yield point defines a maximum allowable test force that may be applied by the child seat installation checking device before the child seat installation checking device causes the child seat to shift, twist, lift off of, or move away from contact with the vehicle seat through application of tension to the shaft by the handle and the tension applicator mechanism.

In a yet another aspect of the present disclosure a system for checking an installation of a child seat with a child seat installation checking device includes a vehicle seat, a child seat disposed on the vehicle seat, a vehicle seatbelt extending from the vehicle seat and at least partially capturing and securing the child seat to the vehicle seat, and a child seat installation checking device. The child seat installation checking device further includes an attachment portion and an anchor portion. The attachment portion engages with and is in contact with a portion of the child seat. The anchor portion is movable relative to and separate from the attachment portion. The anchor portion engages with and is in contact with a portion of the vehicle seat. A shaft extends from the attachment portion to and through a portion of the anchor portion. A tension applicator mechanism is formed in the anchor portion. The shaft extends through and is movably retained within the tension applicator mechanism. A handle is disposed on an end of the shaft opposite the attachment portion. A displacement indicator disposed on the anchor portion or on the tension applicator mechanism displays a quantity of movement of the shaft relative to the anchor portion. The handle is adapted to be grasped by human hands or by a machine, and axial tension applied to the shaft as the handle is pulled away from the anchor portion so that the attachment portion is drawn towards the anchor portion causes the displacement indicator to display a displacement of the shaft.

In a yet another aspect of the present disclosure the attachment portion is formed as a child seat attachment that engages with and rigidly braces against a structural component of the child seat.

In a yet another aspect of the present disclosure the attachment portion is shaped as one or more of an L-shaped bracket, a hook, a T-bar, a latch, or a threaded fitting.

In a yet another aspect of the present disclosure the anchor portion extends from a vehicle contact portion to the tension applicator mechanism. The vehicle contact portion rigidly braces against a structural portion of the vehicle seat or against a structural component of a vehicle in which the vehicle seat is disposed.

In a yet another aspect of the present disclosure each of the anchor portion, the shaft, and the attachment portion are formed of substantially rigid materials.

In a yet another aspect of the present disclosure the tension applicator mechanism further includes one or more of a ratchet, a latch, a spring, a plurality of detents and a pawl, or a threaded receiver for the shaft, and the tension applicator is capable of applying or maintaining an axial tension along the shaft.

In a yet another aspect of the present disclosure the handle further includes one or more of a knob, a t-handle, or a rotatable wheel affixed to the shaft, and the handle is graspable by human hands or by a machine. The knob is manipulated by one or more of pulling, pushing, or twisting to apply axial tension to the shaft by drawing the shaft towards and through the tension applicator mechanism.

In a yet another aspect of the present disclosure the displacement indicator further includes one or more of a visual indicator and an audio indicator. The visual indicator includes at least one of: a gauge, a ruler, a light source, and a color gradient, and the audio indicator includes at least one of: a click and a chime. The displacement indicator depicts an axial displacement of the shaft relative to the tension applicator mechanism.

In a yet another aspect of the present disclosure the tension applicator mechanism further includes a tension yield point. The tension yield point is a predetermined amount of tension appliable to the shaft, and to the child seat before the device measures displacement of the child seat via the displacement indicator.

In a yet another aspect of the present disclosure the tension applicator mechanism further includes a final tension yield point. The final tension yield point defines a maximum allowable test force that may be applied by the child seat installation checking device before the child seat installation checking device causes the child seat to shift, twist, lift off of, or move away from contact with the vehicle seat through application of tension to the shaft by the handle and the tension applicator mechanism.

In a yet another aspect of the present disclosure a method for checking child seat installation with a child seat checking device includes installing a child seat onto a vehicle seat with a vehicle seatbelt. The method further includes temporarily installing the child seat installation checking device, including: placing an attachment portion of the child seat installation checking device in contact with a portion of a child seat, and placing an anchor portion in contact with a portion of a vehicle seat. The anchor portion is movable relative to and separate from the attachment portion. The method further includes applying tension via a handle disposed on an end of a shaft extending from the attachment portion to and through a portion of the anchor portion. The handle is disposed at the end of the shaft opposite the anchor portion. The tension is applied through a tension applicator mechanism formed in the anchor portion. The shaft extends through and is movably retained within the tension applicator mechanism. The method further includes measuring a quantity of movement of the shaft relative to the anchor portion with a displacement indicator disposed on the anchor portion such that axial tension applied to the shaft as the handle is moved away from the anchor portion causes the displacement indicator to display a displacement of the shaft relative to the tension applicator mechanism. The method further includes selectively adjusting the child seat installation based on a measured quantity of movement of the shaft relative to the anchor portion so that a quantity of force applied to the child seat by the seatbelt is altered.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
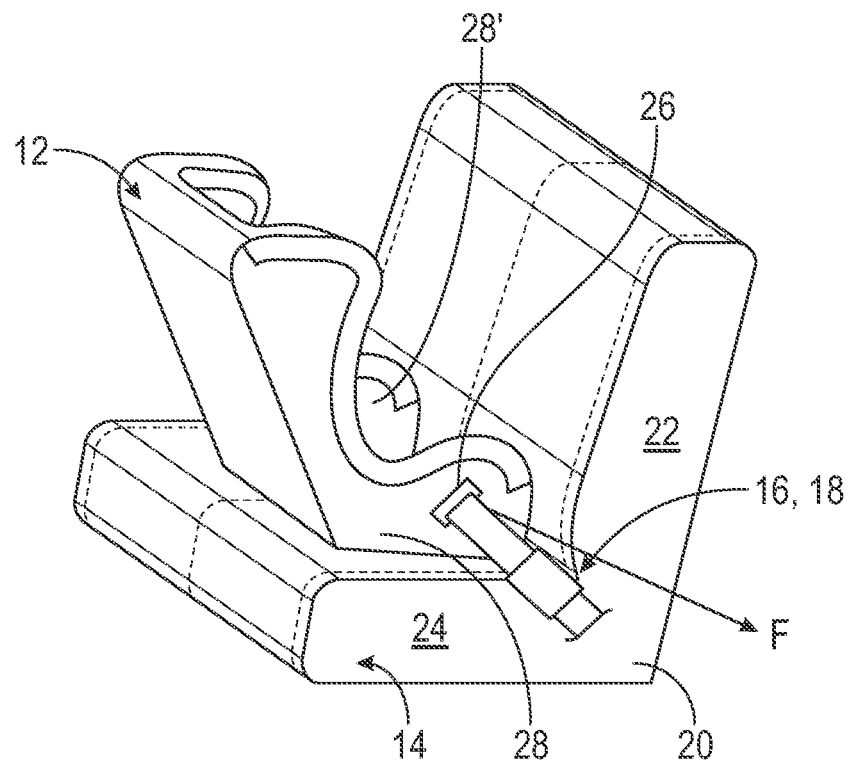
FIG. 1 is a perspective side view of a child seat installation on a vehicle seat where the child seat installation may be checked by the child seat installation checking device according to an exemplary embodiment.
Figure 2:
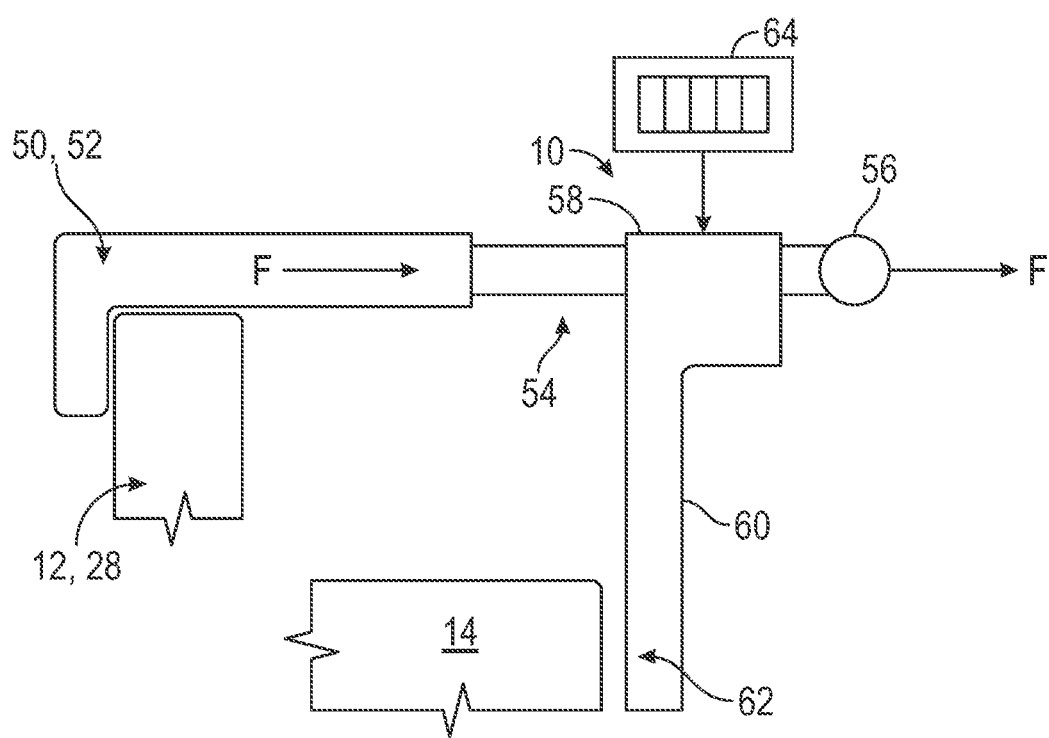
FIG. 2 is a partial perspective side view of a child seat installation checking device in place on a portion of a child seat installed on a vehicle seat according to an exemplary embodiment.
Figure 3:
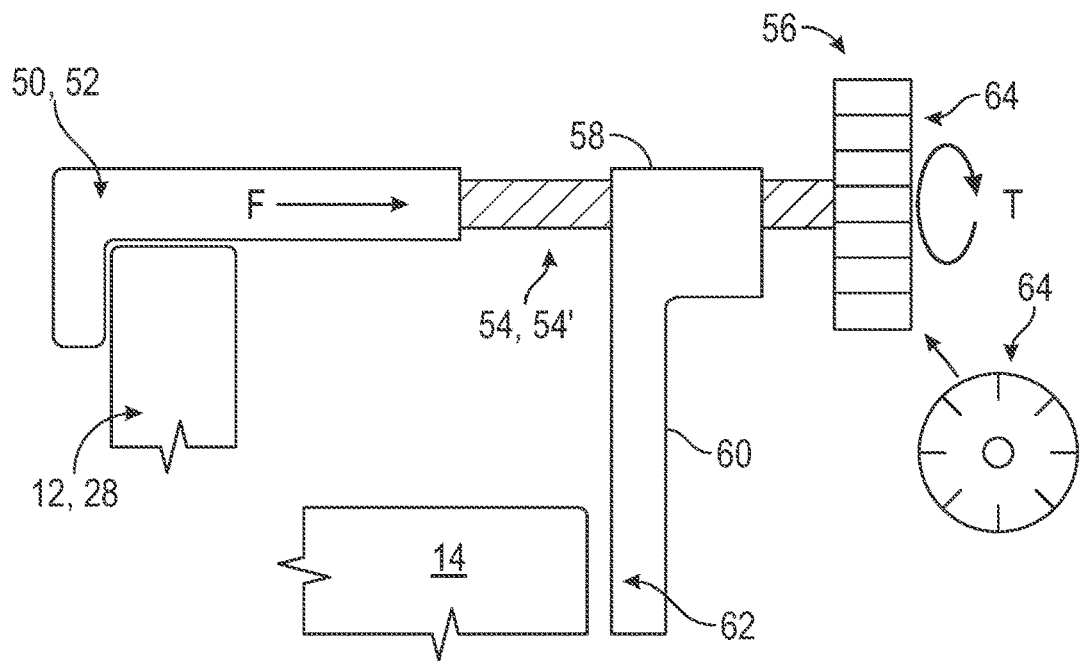
FIG. 3 is a partial perspective side view of a second embodiment of a child seat installation checking device in place on a portion of a child seat installed on a vehicle seat according to an exemplary embodiment.

Referring to FIGS. 1, 2, and 3, a child seat installation checking device or measurement device 10 for checking the installation of a child seat 12 to a vehicle seat 14 is shown. In several aspects, the measurement device 10 operates to detect the tension of a seatbelt 16 affixing the child seat 12 to the vehicle seat 14. The child seat 12 may be any of a wide variety of different types of child seat 12 without departing from the scope or intent of the present disclosure. In some examples, the child seat 12 may be a rear-facing car seat, a forward-facing car seat, convertible seat, an all-in-one seat, a booster seat, or the like without departing from the scope or intent of the present disclosure. Further, while the vehicle seat 14 shown is generally formed as a bench seat, other conformations of seats are intended to be within the scope of the present disclosure. For example, the vehicle seat 14 may also be a bench seat, a bucket seat, a captain's chair, a sports seat, a rumble seat or the like without departing from the scope or intent of the present disclosure.

The seatbelt 16, as will be generally understood, is operable to secure a vehicle occupant to the vehicle seat 14, and may similarly be used to secure the child seat 12 to the vehicle seat 14. In several aspects, the seatbelt 16 includes at least a lap strap 18 that extends from a point proximate a juncture 20 of the backrest 22 and squab 24 of the vehicle seat 14. The lap strap 18 extends laterally across the vehicle seat 14 to a seatbelt tongue (not specifically shown), and the tongue is secured by a seatbelt buckle or anchor (not specifically shown) that is secured to the squab 24 or to the structure of the vehicle proximate the squab 24. A tension reel, retractor, or other such similar spring-loaded, or ratcheting reel automatically provides a predefined amount of tension to the lap strap 18 when the lap strap 18 is secured by the seatbelt buckle. The tension reel and the seatbelt buckle are separated by a lateral distance approximately the width of an average adult human's hips. It should be appreciated that while the seatbelt 16 has been generally described as including a lap strap 18, additional straps may be joined to or extend from the seatbelt buckle. In some specific examples, the additional straps may include one or more shoulder straps, a shoulder harness, or other such multi-point harnesses or belts without departing from the scope or intent of the present disclosure.

In several aspects, the child seat 12 is secured to the vehicle seat at least by the lap strap 18. However the child seat 12 may have additional attachment points through which the shoulder strap, or other straps of the seatbelt 16 may extend, thereby securing the child seat 12 to the vehicle seat 14. The seatbelt 16 extends through an orifice 26 formed through a structural component of the child seat 12. In the specific, but non-limiting example shown in FIG. 1, the lap strap 18 of the seatbelt 16 extends through the orifice 26 formed in a structural side wall 28 of the child seat 12. It should be appreciated that while only one side of the child seat 12 is shown in FIG. 1, that there is a matching orifice 26 formed through the opposite side wall 28' of the child seat 12 through which the lap strap 18 extends and eventually is secured by attachment to the seatbelt buckle or anchor.

In order to fully and properly secure the child seat 12 to the vehicle seat 14, an installer, human or otherwise, threads the seatbelt 16 through the orifices 26 of the child seat 12 and affixes the tongue of the seatbelt 16 to the seatbelt buckle or anchor. The installer then applies a tension to the seatbelt 16, and locks the seatbelt 16 around the child seat. In several aspects, the quantity of tension in the seatbelt 16, when applied by the installer, is substantially higher than the predefined amount of tension in the lap strap 18 when the ratcheting reel is operating on its own. As tension is increasingly applied to the seatbelt 16, the child seat 12 is more and more tightly held against the vehicle seat 14, as the tension applies a force "F" towards the juncture 20 of the backrest 22 and squab 24 of the vehicle seat 14. However, if an excess of force "F" is applied, the orifices 26 of the child seat 12 may suffer mechanical fatigue, or the child seat 12 may be positioned in a way that is less protective of children who may be secured within the child seat 12.

The measurement device 10, shown more specifically in FIGS. 2 and 3, is used to ensure that an appropriate amount of force has been applied to the seatbelt 16 in securing the child seat 12 to the vehicle seat 14. The measurement device 10 includes an attachment portion 50 that contacts and rigidly braces against a structural component such as the structural side wall 28 of the child seat 12. The attachment portion 50 is shown as an L-shaped bracket 52, but may take other forms, such as a hook, a T-bar, a portion of a latch, a threaded fitting, or the like without departing from the scope or intent of the present disclosure. The attachment portion 50 extends to, or is fixedly mounted on a shaft 54. The shaft 54 extends from the attachment portion 50 to a handle 56, passing through a tension applicator mechanism 58 disposed within an anchor portion 60 of the measurement device 10. The shaft 54 shown is cylindrical, but other shaft types are contemplated. In several aspects, tension applicator mechanism 58 is a ratchet, a spring, a threaded receiver for a threaded version of the shaft 54, or another such device capable of applying or maintaining a tension applied via the handle 56 along the shaft 54 of the measurement device 10.

The anchor portion 60 of the measurement device 10 extends from a vehicle seat contact portion 62 to the tension applicator mechanism 58. The vehicle seat contact portion 62 rigidly braces against a structural component of the vehicle seat 14, or a structural component of the vehicle in which the vehicle seat 14 is disposed. While the anchor portion 60 is shown as a having a generally linear, hammer-like shape, it should be appreciated that other shapes may be used without departing from the scope or intent of the present disclosure. In several aspects, the attachment portion 50 and anchor portion 60 are shaped as to rigidly brace against surfaces on the child seat 12 and the vehicle or vehicle seat 14 respectively. Accordingly, the attachment portion 50 and anchor portion 60 may include adapters that may be attached to conform to particular geometries of either or both of the child seat 12 and the vehicle or vehicle seat 14.

The anchor portion 60 is placed in contact with and braced against a portion of the vehicle seat 14. Each of the attachment portion 50, the shaft 54, and the anchor portion 60 are formed of substantially rigid, un-bending, and non-malleable materials. The tension applicator mechanism 58 and/or the shaft 54 and/or the anchor portion 60 is equipped with a displacement indicator 64. Tension may be applied to the shaft 54 by pulling on the handle 56 and drawing the shaft 54 through the tension applicator mechanism 58 and towards the handle 56. As tension is applied to the shaft 54, the displacement indicator 64 will indicate a quantity of linear displacement of the shaft 54. The displacement indicator 64 may take any of a variety of forms without departing from the scope or intent of the present disclosure. In several examples, the displacement indicator 64 is a visual indicator and/or audio indicator showing measured displacement of the shaft 54 by mechanical, pneumatic, hydraulic, electrical, and/or electro-mechanical means, such as via a strain gauge, an auditory signal such as a click, a chime, or the like, or a visual signal, such as movement of a visible ruler-type gauge, the lighting of a light source such as a light-emitting diode (LED), a visible color gradient depicting a distance moved, or the like. In several aspects, the displacement indicator 64 is formed on or within a portion of the tension applicator mechanism 58 and/or on or within a portion of the anchor mechanism 60. The displacement indicator 64 may be formed on a visible exterior surface of the tension applicator mechanism 58 and/or the anchor mechanism 60, or may be disposed within an interior portion of the tension applicator mechanism 58 and/or anchor mechanism 60 without departing from the scope or intent of the present disclosure.

In the example shown in FIG. 2, the attachment portion 50 is braced against the child seat 12, and the anchor portion 60 is braced against a stationary location in the vehicle, such as the vehicle seat 14 proximate a path of the seatbelt 16 across the vehicle seat 14. A measurement device 10 operator may then apply tension to the shaft 54 by manipulating the handle 56. In several aspects, the handle 56 may be a knob, a t-handle, a rotatable wheel affixed to the shaft 54 or the like. The handle is graspable by human hands or by a machine, and may be pulled, pushed, twisted, or the like so that axial tension is applied to the shaft 54 by drawing the shaft 54 in towards and through the tension applicator mechanism 58. In the example of FIG. 3, tension is applied to the shaft 54 by rotating the handle 56 and thereby causing the threaded shaft 54' to be drawn into and through a threaded interior portion of the tension applicator mechanism 58. In several aspects, the tension applicator mechanism 58 may include a ratcheting mechanism, a latch, a spring, a plurality of detents and a pawl or the like, without departing from the scope or intent of the present disclosure. The tension applicator mechanism 58 ensures that tension applied to the shaft 54, 54' does not decrease if the handle 56 when the handle is released.

The tension applicator mechanism 58 includes a tension yield point that ensures that force applied to the child seat 12 via the measurement device 10 does not exceed a predetermined limit. However, even after achieving the tension or force yield point, the shaft 54 may be drawn farther into the tension applicator mechanism 58 at a constant tension or force level, thereby allowing the displacement indicator 64 to show how far the child seat 12 is being moved relative to the vehicle seat 14 at or proximate to the tension or force yield point. In several aspects, the tension or force yield point allows, for example, for the shaft 54 to continue to be pulled, pushed, or screwed within the tension applicator mechanism 58, but the tension applicator mechanism 58 will cease to cause the shaft 54 to apply additional tension or force to the child seat 12.

In further aspects, the measurement device 10 includes a final tension yield point that is preset to a maximum allowable test force. The maximum allowable test force is an amount of force or tension that may be applied by the measurement device 10 before the child seat 12 begins to shift, twist, lift off of, or otherwise move away from contact with the vehicle seat 14 in such a way that the child seat 12 is no longer properly positioned relative to the vehicle seat 14. Upon reaching the maximum allowable test force, the total displacement of the child seat 12 relative to the vehicle seat 14 is viewable on the displacement indicator 64. After the maximum allowable test force has been achieved, when the displacement of the child seat 12 relative to the vehicle seat 14 is below a first threshold value, the child seat 12 is determined to be snug and properly secured to the vehicle seat 14. However, when the maximum allowable test force has been achieved and the total displacement of the child seat 12 relative to the vehicle seat 14 is greater than or equal to the first threshold value, the child seat 12 is determined to be improperly secured to the vehicle seat 14, and the displacement indicator 64 will alert the measurement device 10 operator that additional tightening of the seatbelt 16 is necessary to properly secure the child seat 12 to the vehicle seat 14.

Figure 4:
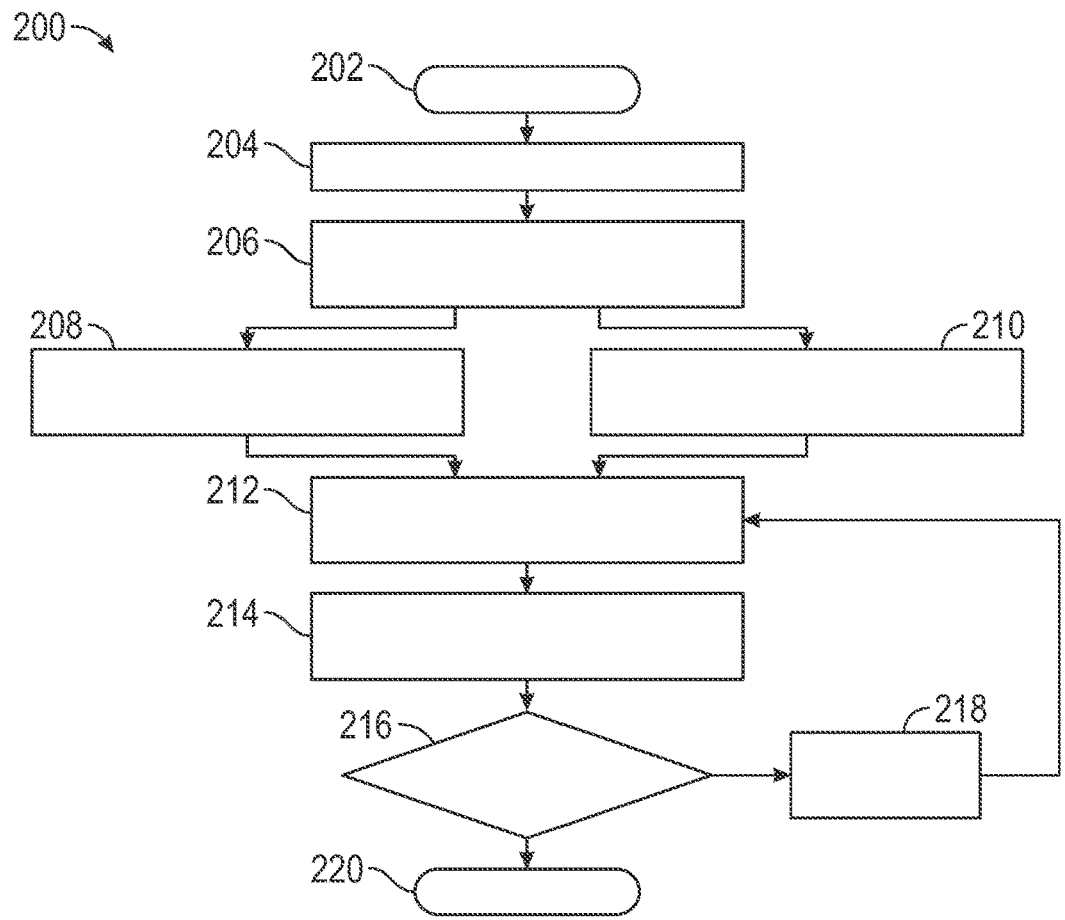
FIG. 4 is a flowchart depicting a method using a child seat installation checking device to verify the correct installation of a child seat on a vehicle seat according to an exemplary embodiment.

Referring now to FIG. 4 and with continuing reference to FIGS. 1-3, a method 200 for checking child seat installation with the child seat installation checking device or measurement device 10 is shown. The method 200 begins at block 202. At block 204 a child seat 12 is installed onto a vehicle seat 14 and secured with a seatbelt 16. At block 206, the measurement device 10 is temporarily installed onto the child seat 12 and vehicle seat 14. Specifically, at block 208 the attachment portion 50 is placed into contact and braced against a structural component, such as the structural sidewall 28 of the child seat 12. At block 210, the anchor portion 60 is installed so that the vehicle seat contact portion 62 is placed in contact with and braced against a structural component of the vehicle seat 14 or of the structure of the vehicle itself. At block 212, an operator or user of the measurement device 10 applies tension "T" to the shaft 54 via the handle 56. In several aspects, the tension "T" is applied through the tension applicator mechanism 58 formed in the anchor portion 60. At block 214, a quantity of movement of the shaft 54 relative to the anchor portion 60 is measured with the displacement indicator 64. Specifically, axial tension "T" is applied to the shaft 54 as the handle 56 is moved away from the anchor portion 60, and causes the displacement indicator 64 to display a displacement of the shaft 54 relative to the tension applicator mechanism 58. At block 216, based on readings on the displacement indicator 64 an operator or user of the measurement device 10 determines whether the child seat 12 has been properly installed. At block 216 when the displacement indicator 64 indicates that the child seat 12 is improperly secured, the method 200 proceeds to block 218 and the operator user selectively adjusts a tension in the seatbelt 16 to ensure that the child seat 12 is properly secured against the vehicle seat 14. In some examples, adjusting the tension may require increasing an amount of tension in the seatbelt 16 to better apply compressive force "F" to the child seat 12, while in other examples, adjusting the tension may require decreasing an amount of tension in the seatbelt 16 to cause the child seat 12 to be properly oriented and positioned on the vehicle seat 14. Once the seatbelt 16 tension has been adjusted, the method 200 returns to block 212 to re-apply tension to the measurement device 10. However, if the displacement indicator 64 shows that the child seat 12 is correctly installed and that seatbelt 16 is therefore properly tensioned, the measurement device 10 is removed and the method 200 ends at block 220. The method 200 may be repeated as many times as necessary to ensure that the child seat 12 is properly secured on the vehicle seat 14 according to the specifications of the particular child seat 12.

A child seat installation checking device of the present disclosure offers several advantages. These include the ability to ensure that the child's car seat is properly and securely attached to the vehicle seat 14, without hindering the child seat 12 installation mechanism and procedure, while reducing child seat 12 installation complexity and confusion, and reducing the potential for unintentionally leaving the child's seat 12 unsecured or improperly secured within the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A child seat installation checking device, the device comprising:
    an attachment portion, the attachment portion engaging with and in contact with a portion of a child seat;
    an anchor portion, the anchor portion movable relative to and separate from the attachment portion, the anchor portion engaging with and in contact with a portion of a vehicle seat;
    a shaft extending from the attachment portion to and through a portion of the anchor portion;
    a tension applicator mechanism formed in the anchor portion, the shaft extending through and movably retained within the tension applicator mechanism;
    a handle disposed on an end of the shaft opposite the attachment portion; and a displacement indicator disposed on the anchor portion, the displacement indicator displaying a quantity of movement of the shaft relative to the anchor portion, and wherein the handle is adapted to be grasped by human hands or by a machine, and wherein axial tension applied to the shaft as the handle is pulled away from the anchor portion so that the attachment portion is drawn towards the anchor portion causes the displacement indicator to display a displacement of the shaft.

2. The device of claim 1, wherein the attachment portion is formed as a child seat attachment that engages with and rigidly braces against a structural component of the child seat.

3. The device of claim 2, wherein the attachment portion is shaped as one or more of an L-shaped bracket, a hook, a T-bar, a latch, or a threaded fitting.

4. The device of claim 1, wherein the anchor portion extends from a vehicle contact portion to the tension applicator mechanism, wherein the vehicle contact portion rigidly braces against a structural portion of the vehicle seat or against a structural component of a vehicle in which the vehicle seat is disposed.

5. The device of claim 1, wherein each of the anchor portion, the shaft, and the attachment portion are formed of substantially rigid materials.

6. The device of claim 1, wherein the tension applicator mechanism further comprises:

one or more of a ratchet, a latch, a spring, a plurality of detents and a pawl, or a threaded receiver for the shaft; and the tension applicator is capable of applying or maintaining an axial tension along the shaft.

7. The device of claim 1, wherein the handle further comprises:

one or more of a knob, a t-handle, or a rotatable wheel affixed to the shaft, and the handle is graspable by human hands or by a machine, wherein the knob is manipulated by one or more of pulling, pushing, or twisting to apply axial tension to the shaft by drawing the shaft towards and through the tension applicator mechanism.

8. The device of claim 1, wherein the displacement indicator further comprises:

one or more of a visual indicator and an audio indicator, wherein the visual indicator comprises at least one of: a gauge, a ruler, a light source, and a color gradient; and wherein the audio indicator comprises at least one of: a click and a chime; and wherein the displacement indicator depicts an axial displacement of the shaft relative to the tension applicator mechanism.

9. The device of claim 1, wherein the tension applicator mechanism further comprises:

a tension yield point, wherein the tension yield point is a predetermined amount of tension appliable to the shaft, and to the child seat before the device measures displacement of the child seat via the displacement indicator; and a final tension yield point, wherein the final tension yield point defines a maximum allowable test force that may be applied by the child seat installation checking device before the child seat installation checking device causes the child seat to shift, twist, lift off of, or move away from contact with the vehicle seat through application of tension to the shaft by the handle and the tension applicator mechanism.

10. A system for checking an installation of a child seat with a child seat installation checking device, the system comprising:

a vehicle seat;

a child seat disposed on the vehicle seat;

a vehicle seatbelt extending from the vehicle seat and at least partially capturing and securing the child seat to the vehicle seat;

a child seat installation checking device comprising:

an attachment portion, the attachment portion engaging with and in contact with a portion of the child seat;

an anchor portion, the anchor portion movable relative to and separate from the attachment portion, the anchor portion engaging with and in contact with a portion of the vehicle seat;

a shaft extending from the attachment portion to and through a portion of the anchor portion;

a tension applicator mechanism formed in the anchor portion, the shaft extending through and movably retained within the tension applicator mechanism;

a handle disposed on an end of the shaft opposite the attachment portion; and a displacement indicator, the displacement indicator displaying a quantity of movement of the shaft relative to the anchor portion, and wherein the handle is adapted to be grasped by human hands or by a machine, and wherein axial tension applied to the shaft as the handle is pulled away from the anchor portion so that the attachment portion is drawn towards the anchor portion causes the displacement indicator to display a displacement of the shaft.

11. The system of claim 10, wherein the attachment portion is formed as a child seat attachment that engages with and rigidly braces against a structural component of the child seat.

12. The system of claim 11, wherein the attachment portion is shaped as one or more of an L-shaped bracket, a hook, a T-bar, a latch, or a threaded fitting.

13. The system of claim 10, wherein the anchor portion extends from a vehicle contact portion to the tension applicator mechanism, wherein the vehicle contact portion rigidly braces against a structural portion of the vehicle seat or against a structural component of a vehicle in which the vehicle seat is disposed.

14. The device of claim 10, wherein each of the anchor portion, the shaft, and the attachment portion are formed of substantially rigid materials.

15. The device of claim 10, wherein the tension applicator mechanism further comprises:

one or more of a ratchet, a latch, a spring, a plurality of detents and a pawl, or a threaded receiver for the shaft; and the tension applicator is capable of applying or maintaining an axial tension along the shaft.

16. The device of claim 10, wherein the handle further comprises:

one or more of a knob, a t-handle, or a rotatable wheel affixed to the shaft, and the handle is graspable by human hands or by a machine, wherein the knob is manipulated by one or more of pulling, pushing, or twisting to apply axial tension to the shaft by drawing the shaft towards and through the tension applicator mechanism.

17. The system of claim 10, wherein the displacement indicator further comprises:

one or more of a visual indicator and an audio indicator, wherein the visual indicator comprises at least one of: a gauge, a ruler, a light source, and a color gradient; and wherein the audio indicator comprises at least one of: a click and a chime; and wherein the displacement indicator depicts an axial displacement of the shaft relative to the tension applicator mechanism.

18. The system of claim 10, wherein the tension applicator mechanism further comprises:

a tension yield point, wherein the tension yield point is a predetermined amount of tension appliable to the shaft, and to the child seat before the device measures displacement of the child seat via the displacement indicator.

19. The system of claim 10, wherein the tension applicator mechanism further comprises:

a final tension yield point, wherein the final tension yield point defines a maximum allowable test force that may be applied by the child seat installation checking device before the child seat installation checking device causes the child seat to shift, twist, lift off of, or move away from contact with the vehicle seat through application of tension to the shaft by the handle and the tension applicator mechanism.

20. A method for checking child seat installation with a child seat checking device, the method comprising:

installing a child seat onto a vehicle seat with a vehicle seatbelt;

temporarily installing the child seat installation checking device, including:

placing an attachment portion of the child seat installation checking device in contact with a portion of a child seat;

placing an anchor portion in contact with a portion of a vehicle seat, the anchor portion movable relative to and separate from the attachment portion;

applying tension via a handle disposed on an end of a shaft extending from the attachment portion to and through a portion of the anchor portion, wherein the handle is disposed at the end of the shaft opposite the anchor portion, the tension being applied through a tension applicator mechanism formed in the anchor portion, the shaft extending through and movably retained within the tension applicator mechanism; and measuring a quantity of movement of the shaft relative to the anchor portion with a displacement indicator disposed on the anchor portion, wherein axial tension applied to the shaft as the handle is moved away from the anchor portion causes the displacement indicator to display a displacement of the shaft relative to the tension applicator mechanism; and selectively adjusting the child seat installation based on a measured quantity of movement of the shaft relative to the anchor portion so that a quantity of movement of the child seat relative to the vehicle seat is altered.

\* \* \* \* \*